J. F. & G. E. LOCKWOOD.
Carburetor.
No. 160,690
Patented March 9, 1875.
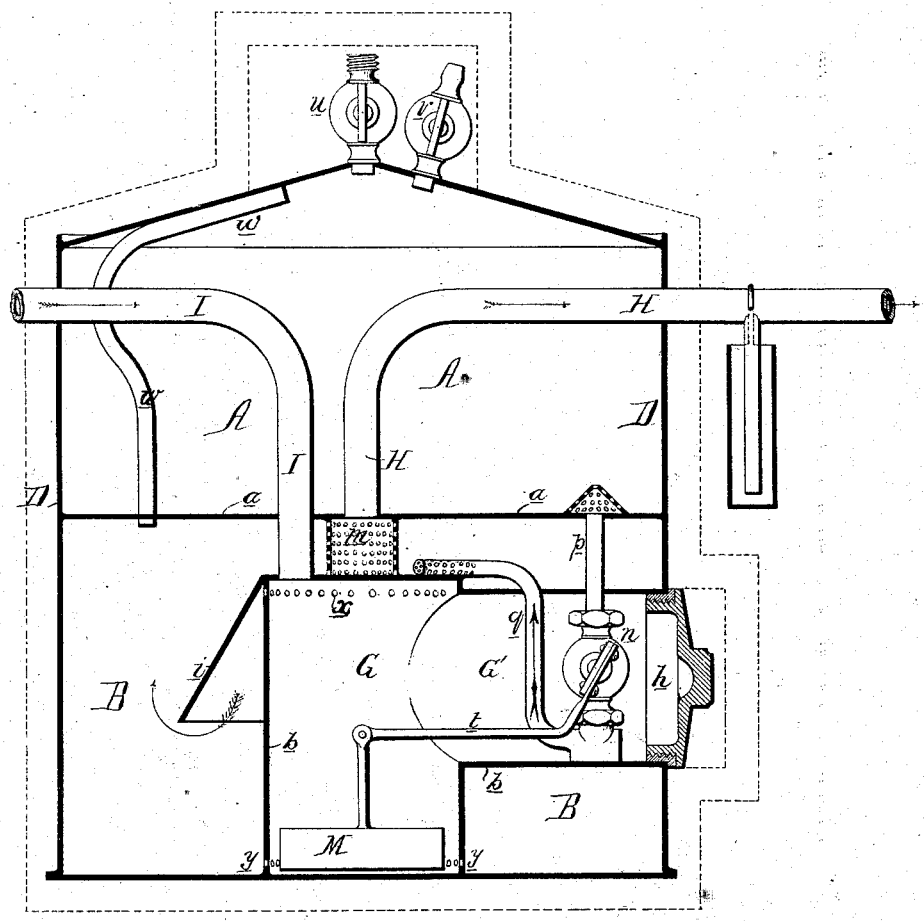
Witnesses
Thomas McIlvain
John K. Rupertus
James F. Lockwood
and George E. Lockwood
by their Attorneys
Howson and Son
THE GRAPHIC CO.PHOTO-LITH.39 & 41 PARK PLACE,N.Y.

UNITED STATES PATENT OFFICE.

JAMES F. LOCKWOOD AND GEORGE E. LOCKWOOD, OF PHILADELPHIA, PA.

IMPROVEMENT IN CARBURETERS.

Specification forming part of Letters Patent No. 160,690, dated March 9, 1875; application filed January 15, 1875.

*To all whom it may concern:*

Be it known that we, JAMES F. LOCKWOOD and GEORGE E. LOCKWOOD, of Philadelphia, Pennsylvania, have invented certain Improvements in Carbureters, of which the following is a specification:

Our invention relates to certain improvements in the carbureters for which reissued Letters Patent were granted to us on the 11th day of August, 1874; and the object of our improvements is to so construct the carbureter that ready access may be had to the valve and automatic appliances for regulating the admission of hydrocarbon.

This object we attain in the manner which we will now proceed to describe, reference being had to the accompanying drawing, which represents our improved carbureter in section.

The casing D is separated, by a partition, *a*, into the upper chamber A, containing the hydrocarbon, and the lower or carbureting chamber B, which is filled with sawdust or other equivalent absorbent and granular material. Within the chamber B is a casing, B, within which is the regulating-chamber G, a branch, G′, of the latter extending to the casing D, and the entrance to this branch being furnished with a screw-plug, *h*, on removing which access may be had to the automatic valve and its appliances, referred to hereafter. The chamber G has, near its closed top, lateral openings *x*, and on the outside of this chamber is a deflector, *i*, similar to that described in our aforesaid reissued patent. Between the top of the chamber G and the partition *a* is a perforated receiver, *m*, from which a pipe, H, passes to the burners, and I is a pipe for conveying the gas to the chamber G. A chest, *n*, containing the automatic valve, is situated within the branch G′ of the chamber G, and communicates in one direction, through the tube *p*, with hydrocarbon-chamber A, and in another direction, through the pipe *q*, with the carbureting-chamber, at a point above the chamber G. The chest *n* and its valve may be constructed in different ways, providing they be such as to insure the opening and closing, by the action of a float, M, of communication between the tubes *p* and *q*. In the present instance *n* is an ordinary faucet, to the plug of which is connected the arm *t*, and to the latter is suspended the above-mentioned float M. A pipe, *w*, affords a communication between the carbureting-chamber B and chamber A, the upper end of the said pipe being always above the level of the hydrocarbon in the said chamber A, so that while the pipe serves to equalize the pressure in the two chambers it affords no avenue for the passage of the hydrocarbon into the carbureting-chamber.

The gas conveyed to the chamber G through the pipe I passes through the perforations *x*, near the top of the said chamber, into the space within the deflector *i*, by which the gas is directed outward and downward into the mass of saturated sawdust with which the chamber B is filled, the gas, after permeating this mass of sawdust, and being surcharged with the hydrocarbon, passing into the perforated chamber *m*, and thence, through the pipe H, to the burners.

It is important that while the sawdust should always be maintained in a well-saturated condition too much hydrocarbon should not be admitted to the chamber B, to prevent the free passage of the gas through the mass of sawdust. Should there be a superfluity of the hydrocarbon in this chamber it will pass through perforations *y* at the lower end of the chamber G, and will raise the float M, and consequently obstruct the communication between the tubes *p* and *q* to an extent depending upon the amount of liquid which passes into the chamber, and, therefore, the hydrocarbon permitted to escape through the perforated end of the tube *q* into the chamber B will be commensurate with the demands of the absorbing sawdust.

The cock in chest *n* is so connected to the tubes *p* and *q* and rod *t* that it can be readily detached therefrom, and withdrawn from the branch G′ of the chamber G after removing the cover *h*. The casing D is furnished at the top with two cocks, *u* and *v*, the former, when the carbureter has to be replenished, being connected by a tube to the can or reservoir containing the supply of hydrocarbon, and the cock *v* being connected by a pipe to the same reservoir at a point above the level of the liquid therein, so that the free passage of the liquid from the reservoir into the chamber A of the carbureter may be insured without any dangerous exposure of the liquid, or of the gases which are evolved therefrom.

It should be understood that the entire carbureter is inclosed within an exterior casing, (shown by dotted lines,) and that between this casing and that of the carbureter there is a packing of non-conducting material to insure freedom from accidents. Whenever access has to be had to the carbureter, as, for instance, where the cocks $u$ and $v$ and plug $h$ are situated, there must be suitable openings in this exterior casing, but the openings should be provided with suitable covers packed with non-conducting material.

We claim as our invention—

The combination, in the carbureter, of the chamber G, the branch G' of the same, extending to the casing D, and closed by a detachable plug, $h$, the valve-chest $n$ contained within said branch, and the float M connected to the valve of the chest, all as set forth.

In testimony whereof we have signed our names to this specification in the presence of two subscribing witnesses.

JAMES F. LOCKWOOD.
GEORGE E. LOCKWOOD.

Witnesses to the signature of J. F. LOCKWOOD:
ANDREW GRIMES,
ISAAC H. C. ROYSE.

Witnesses to the signature of G. E. LOCKWOOD:
HUBERT HOWSON,
HARRY SMITH.